United States Patent [19]

Rall

[11] Patent Number: 5,216,625
[45] Date of Patent: Jun. 1, 1993

[54] AUTOCALIBRATING DUAL SENSOR NON-CONTACT TEMPERATURE MEASURING DEVICE

[75] Inventor: Dieter L. Rall, Los Altos, Calif.

[73] Assignee: Luxtron Corporation, Santa Clara, Calif.

[21] Appl. No.: 429,983

[22] Filed: Nov. 1, 1989

[51] Int. Cl.$^5$ .................... G01K 13/06; G01J 05/12
[52] U.S. Cl. .................................... 364/557; 374/121
[58] Field of Search .................. 364/557; 374/39, 40, 374/120, 121

[56] References Cited

U.S. PATENT DOCUMENTS

| | | | |
|---|---|---|---|
| 2,991,654 | 7/1961 | Engelhard | 374/135 |
| 3,111,844 | 11/1963 | Van Luik, Jr. | 374/29 |
| 3,427,882 | 2/1969 | Wagner | 374/120 |
| 3,430,492 | 3/1969 | Matsumoto et al. | 374/133 |
| 3,475,962 | 11/1969 | Mazur | 374/121 |
| 3,525,260 | 8/1970 | Kung | 136/214 |
| 3,542,123 | 11/1970 | Hornbaker et al. | 165/39 |
| 3,605,490 | 9/1971 | Progelhof et al. | 374/29 |
| 3,715,923 | 2/1973 | Hornbaker et al. | 374/134 |
| 3,720,103 | 3/1973 | Adams et al. | 374/29 |
| 3,926,053 | 12/1975 | Schurrer et al. | 374/101 |
| 4,408,903 | 10/1983 | Baldasarri et al. | 374/121 |
| 4,621,615 | 11/1986 | McGee | 374/29 X |
| 4,906,105 | 3/1990 | Geake | 374/121 X |

FOREIGN PATENT DOCUMENTS 1573346 12/1964 Fed. Rep. of Germany .

Primary Examiner—Edward R. Cosimano
Attorney, Agent, or Firm—Majestic, Parsons, Siebert & Hsue

[57] ABSTRACT

A method and apparatus for measuring the temperature of an external body is disclosed. The apparatus comprises dual thermal sinks or reference bodies wherein heat flow sensors are mounted. By utilizing dual thermal reference bodies, which are at different temperatures, the method of the invention yields the absolute temperature of the external body by measuring the temperatures of the referenced bodies and the heat flow rates between each of the reference bodies and the external body. The apparatus automatically calculates the proportionality constant between the heat flow rates and the temperature differences between the external body and the reference bodies and thus calculates the external body temperature.

10 Claims, 3 Drawing Sheets

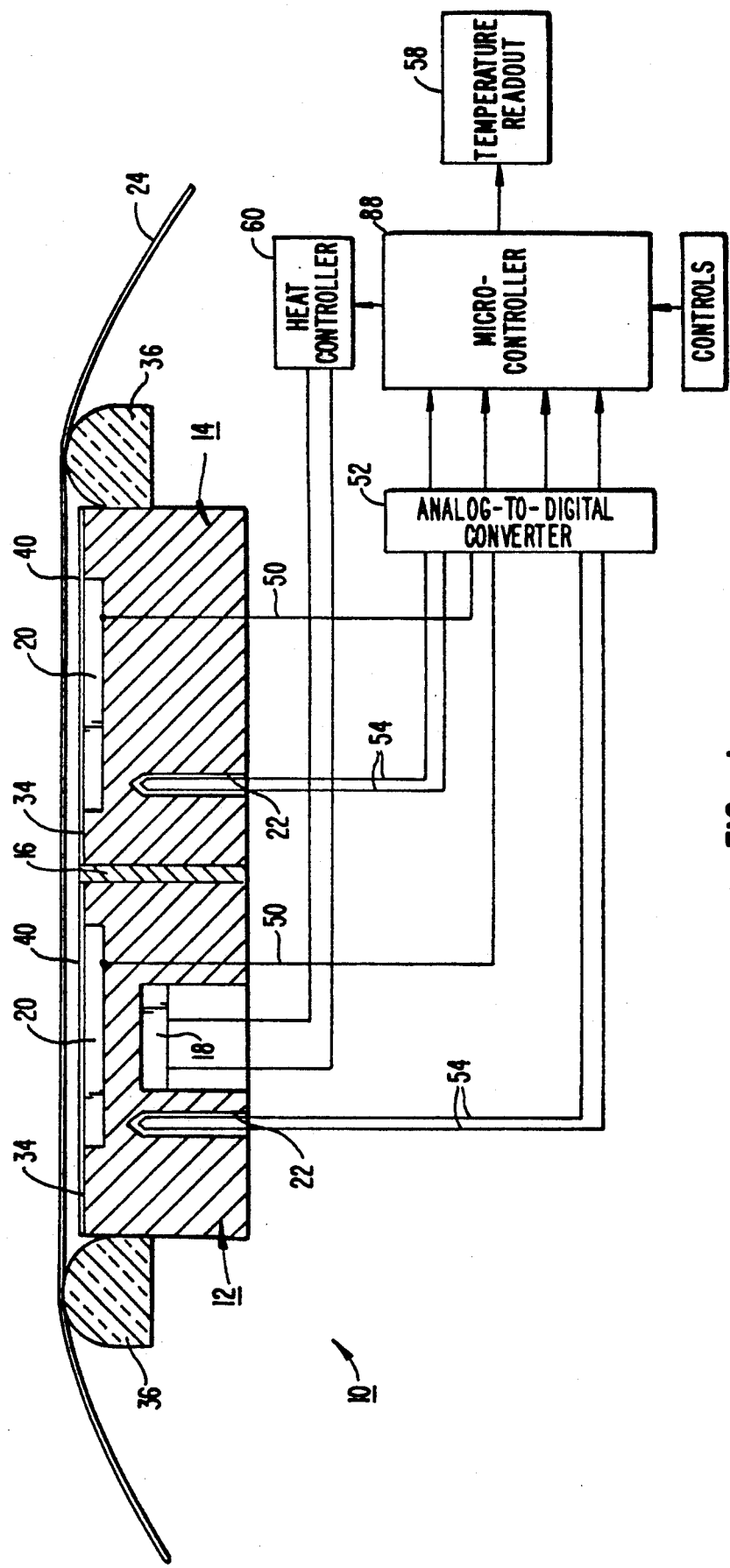
FIG._1.

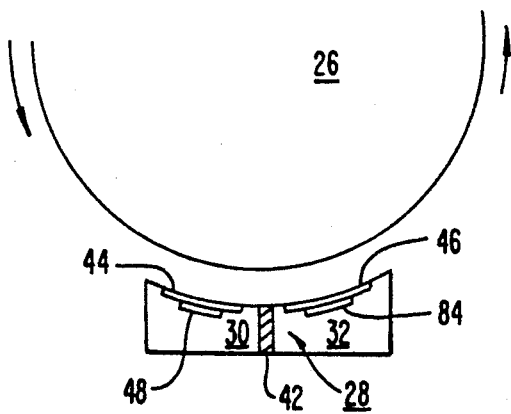
FIG._2.
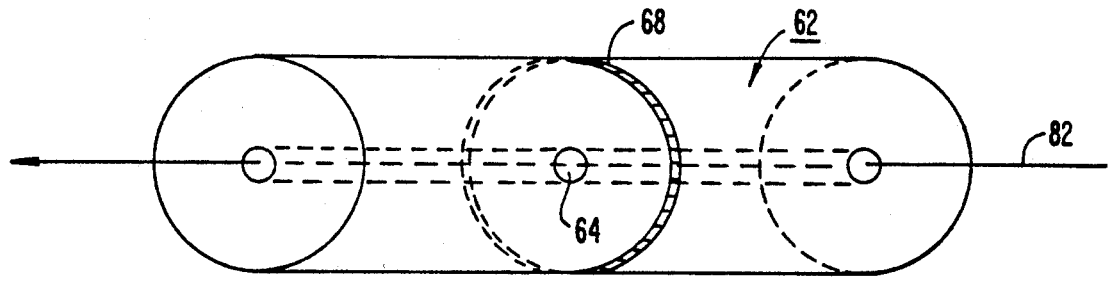
FIG._3.
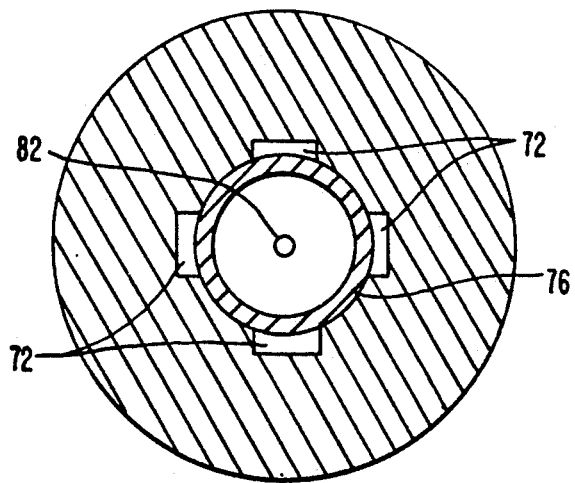
FIG._5.

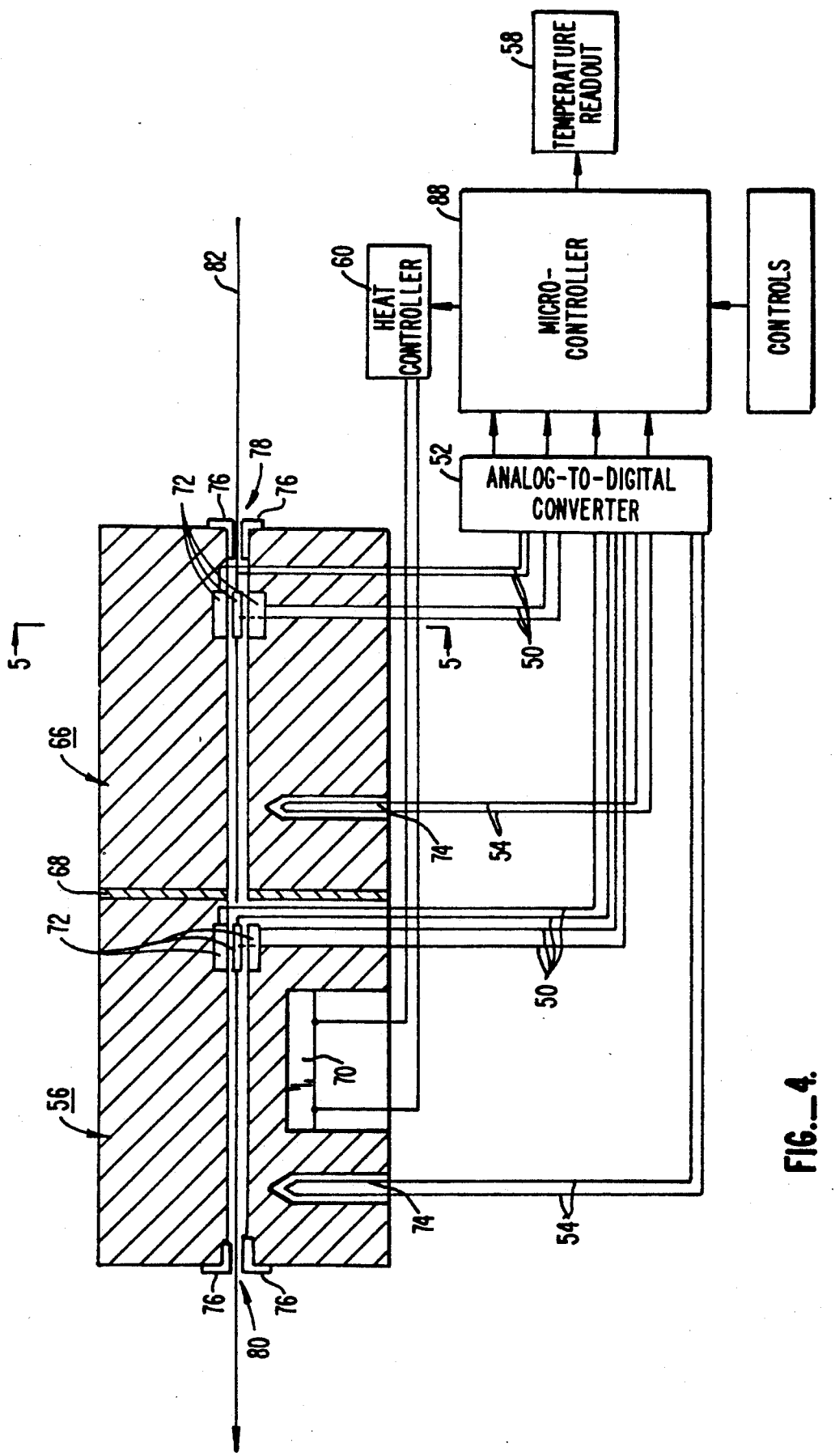
FIG._4.

AUTOCALIBRATING DUAL SENSOR NON-CONTACT TEMPERATURE MEASURING DEVICE

BACKGROUND OF THE INVENTION

This invention relates generally to a method and apparatus for measuring the temperature of an external medium or proximate body, and particularly a moving external body.

The temperature of moving and non-moving objects is generally now measured by a variety of methods and apparatuses including non-contact temperature detection devices which rely on the principle that net heat exchange between a reference body and an external body is zero when the bodies are at the same temperature. Reference is made to U.S. Pat. Nos. 3,542,123 and 3,715,923 for details regarding an apparatus employing this principle. Such non-contact devices contain a high thermal conductivity reference body mounting a heat flow sensor to determine the heat flow between the reference body and an external body located adjacent to the reference body. A temperature sensor provides a signal proportional to the temperature of the referenced body. In addition, the apparatus includes means for establishing the spacing between the reference and external bodies so that the heat flow sensor output signal can be calibrated to yield the absolute temperature of the external body.

As the external body moves past the heat flow sensitive surface of the reference body, heat will be exchanged by convection between the external and reference bodies whenever they are not at the same temperature. This will cause heat to flow into or out of the sensing head surface of the reference body. The magnitude of heat flow will be proportional to the temperature difference between the bodies, the distance between the bodies, and the thermal conductance of the heat flow path across the spacing between them. By keeping the spacing constant, it is possible to calibrate the heat flow rate, measured by the heat flow sensor in the reference body, as a function of the temperature difference between the reference and external bodies for a given reference body temperature. By adding this measured, calibrated temperature difference between the bodies to the reference body temperature measured by the temperature sensor in the reference body, the temperature of the external moving body is obtained. While the devices are primarily used to measure the temperature of moving objects, they are suitable for many applications involving stationary objects as well.

However, one major drawback of these non-contact devices is that they must be manually recalibrated whenever the spacing or heat transfer conditions between the reference and external bodies changes, thereby resulting in unnecessary delays.

Therefore, it is a primary object of the present invention to provide an improved, convenient method and apparatus for measuring the temperature of an external body that continues to function even as conditions between the apparatus and external body change.

It is another object of the present invention to provide an improved method and apparatus for measuring the temperature of an external body that automatically calculates the proportionality constant between the heat flow rate and the temperature gradient between the external body and the reference body.

It is a further object of the present invention to provide an improved method and apparatus for measuring the temperature of fast-moving continuous elements such as wires, filaments, webs and rolls.

SUMMARY OF THE INVENTION

These and additional objects are accomplished by the various aspects of the present invention wherein a temperature measuring apparatus is provided which includes two heat flow sensors of the same sensitivity designated as heat flow sensor A and heat flow sensor B with each sensor being mounted in a high thermal conductivity reference body, designated reference body A and reference body B, respectively. The two reference bodies operate at different temperatures as one of the bodies is either heated or cooled; moreover, a thermal barrier between them maintains the temperature differential. The temperatures of the referenced bodies, denoted $T_A$ and $T_B$, respectively, are measured by temperature sensors located in the bodies.

Each heat flow sensor measures the heat flow between its reference body and an external body, whose temperature is being measured. When the reference bodies are exposed to the external body, the heat transfer rates between the two heat flow sensors and the external body are proportional to the respective temperature differences between the two heat flow sensors and the external body. The heat flow sensors also generate signals such as voltage output signals, denoted as $E_A$ and $E_B$, that are proportional to said temperature differentials. Based on the measured values of $T_A$, $T_B$, $E_A$ and $E_B$, the invention further enables the determination of the external body temperature.

The invention obviates the need for calibrating the heat flow sensor output signals to the spacing between the reference and external bodies. Thus, even if the distance or configuration of the spacing between the external body and the reference bodies changes, the invention continues to monitor the temperature of the external body. This is particularly advantageous for measuring the temperature of moving objects or in other applications where this distance or configuration is subject to change. The only criterion is that fluctuations in this distance caused by changes in the external body be equal relative to both reference bodies. In other words, while the distance between reference body A and the external body, denoted $X_A$, and the distance between reference body B and the external body, denoted $X_B$, are variables that may change with time, the inventive concept remains applicable so long as $X_A$ equals $X_B$.

For instance, in the production of photographic film, wires or plastic filaments, it is desirable to monitor the temperature of these products and to do so without contact. The inventive apparatus is ideally suited for this purpose since the device does not disturb the product by physical engagement; moreover, even when process conditions change, as when wires of different thicknesses are manufactured, the apparatus continues to operate without the need to shut down the process for recalibration.

However, like any other temperature measuring device, the apparatus has certain practical limitations. For example, since the reference bodies are maintained at different temperatures, there will always be a temperature differential between the external object and at least one of the reference bodies. Therefore, the temperature of an object will be influenced by the apparatus itself, although the amount of influence is negligible when the object is moving and not in contact with reference bodies.

Notwithstanding the above limitations, the inventive method and apparatus can be utilized in an array of applications including those described above. Moreover, these limitations, which are inherent to temperature measuring devices in general, are recognized and readily dealt with by persons skilled in the art when using the invention.

BRIEF DESCRIPTION OF THE DRAWINGS

FIG. 1 is a partially diagrammatic view of an embodiment of the present temperature measuring apparatus, including an enlarged transverse cross-sectional view of the reference bodies, which is adapted for detecting the temperature of a moving web;

FIG. 2 is a diagrammatic view of the reference bodies of an embodiment of the invention whose surfaces are contoured to match the curvature of a moving roll;

FIG. 3 is a perspective view of an embodiment of the temperature detection apparatus which is particularly adopted for detecting the temperature of fast moving elongated objects;

FIG. 4 is a partially diagrammatic view of the apparatus in FIG. 3, including an enlarged transverse cross-sectional view of the reference bodies; and FIG. 5 is a view taken along the line 5—5 of FIG. 4.

DESCRIPTION OF THE PREFERRED EMBODIMENTS

One feature of the present invention is the ability of the apparatus to measure the temperature of an object without physical contact. This feature arises from the recognition that the heat flow rate between a reference body and an external body is proportional to the temperature of the latter. By employing dual heat flow sensors of the same sensitivity, the present invention also achieves autocalibration. It should be noted that while heat flow sensors manufactured from the same design and materials exhibit the same sensitivities, to practice the prevent invention it is not necessary to employ identical sensors but only heat flow sensors of the same sensitivity. The autocalibration aspect of the invention is based on the correlation between the external body temperature, the reference body temperatures, and the voltage generated by the heat flow sensors.

It is generally known that the heat flow rates between two heat flow sensors of the same sensitivity (designated as sensor A and sensor B) and the external body or product can be expressed as:

$$Q_A = CE_A = \frac{K}{\Delta X}(T_p - T_A)$$

$$Q_B = CE_B = \frac{K}{\Delta X}(T_p - T_B)$$

Where:
$Q_A$ = heat flow rate between product and sensor A
$Q_B$ = heat flow rate between product and sensor B
$K$ = conductance of thermal path between product and sensor (identical for both sensors)
$\Delta X$ = distance of thermal path between product and sensor (identical for both sensors)
$C$ = constant of proportionality between $Q_A$ and $E_A$, and $Q_B$ and $E_B$. (Identical as both heat flow sensors are made with the same sensitivity.)

$E_A$ = voltage generated by heat flow sensor A and is proportional to $Q_A$
$E_B$ = voltage generated by heat flow sensor B and is proportional to $Q_B$
$T_p$ = temperature of external body or product
$T_A$ = temperature of reference body containing sensor A
$T_B$ = temperature of reference body containing sensor B From these two equations, the temperature of the external body or product can, according to the present invention, be expressed as:

$$T_p = T_A + E_A \frac{(T_A - T_B)}{(E_B - E_A)}$$

wherein the temperature of the external body or product $T_p$ is expressed as a function of $T_A$, $T_B$, $E_A$ and $E_B$ only. As described herein, the invention provides accurate measurements of these variables from which the temperature $T_p$ of the external body is calculated by the equation set forth above. The present invention is thus self-calibrating and insensitive to variations in the distance or conductivity of the spacing between an external body and the heat flow sensors. As will be described in greater detail, a micro-controller programmed to receive input signals corresponding to parameters $T_A$, $T_B$, $E_A$ and $E_B$ can be employed to calculate $T_p$ based on the above equation.

Referring now to FIG. 1, a temperature detection apparatus 10 is illustrated which comprises, generally, two thermally conductive reference bodies 12 and 14 separated by a thermal barrier 16; temperature change means for altering the temperature of reference body 12, including an electrical resistance heating element or cartridge 18; heat flow sensors 20 with the same sensitivity; and temperature sensors 22.

The apparatus 10 is adapted to detect the temperature of any fixed surface external body including films, webs, and elongated elements. The temperature of web 24 is measured by placement of the reference bodies 12 and 14 in proximity to the web 24 without physically contacting the web. A web encompasses any continuous material including thin metal sheets, fabrics, strips, paper, or the like. The reference bodies 12 and 14 are thermally conductive reference bodies made of material such as anodized aluminum, nickel plated copper or the like, and each constitutes a thermal sink into and out of which heat flow can occur.

In the first reference body 12, the operative face 34 is located a distance from the web 24 whose temperature is to be measured. The web 24 moves along a path in close proximity to the heat flow sensor 20 and the operative face 34 of reference body 12. The first reference body 12 and the second reference body 14 are separated by a thermal barrier 16 that can consist of an air gap or any suitable non-heat-conductive material such as aramid paper. For the second reference body 14, heat flow sensor 20 is the same distance from the web 24 as the heat flow sensor in the first reference body 12 is from the web. The distance between the web 24 and the heat flow sensors 20 afforded by this arrangement is approximately 0.030 to 0.125 inch, although of course, this will vary with product velocity and the attendant boundary layer thickness which will result from the particular application at hand.

Although not necessary to practice the invention, guides 36 can be employed to facilitate passage of the web across the heat flow sensors 20.

The cartridge heater 18 may be any suitable heater for raising the temperature of the mass of reference body 12. Various other means could also be used for raising the temperature of the reference body 12, such as fluid heating passages provided therein. It should be noted that since the present invention requires only that the temperatures of the reference bodies 12 and 14 be different, cooling rather than heating one of the heads can be employed.

The particular form of heat flow sensor utilized is not critical to the present invention, so long as it is capable of sensing the convective heat flow resulting from a temperature differential between the web 24 and the mass of the reference bodies 12 and 14. The heat flow sensors 20 illustrated are thermoelectric devices or differential thermopiles adapted to generate voltages proportional to the rates of heat flow into or out of the surfaces on which they are mounted.

Each operative face 34 may be provided with a thin thermally reflective coating 40, such as gold or aluminum, which is operative to reflect any extraneous radiant heat flow component through the web 24 or elsewhere, without affecting the larger and more significant convective-conductive heat flow components. Although not part of the inventive method, reflective coating is useful when the product to be measured is made of material that is transparent to radiation.

The temperature sensor 22 is disposed within and in thermal exchange relation with the walls of a bore provided in reference body 12. A temperature sensor 22 is similarly situated in reference body 14. Each of the temperature sensors 22 is preferably a platinum RTD located relatively close to the operative faces 34. The temperature sensors 22 generate voltages proportional to their temperatures and could, if desired, also take the form of thermocouples or other means suitable for the purpose described.

The output signals from the heat flow sensors 20 are applied through leads 50, in turn, to an analog to digital converter 52. The converter 52, as will be apparent to those skilled in the art, is selected and operated such as to adjust the magnitude of the output signals from the heat flow sensors 20 to a convenient sensitivity in terms of the volts per heat flow rate per unit area. The voltage output signal form heat flow sensor 20 in reference body 12 is designated $E_A$. Similarly, $E_B$ denotes the voltage output signal from heat flow sensor 20 in reference body 14. Output signals from the temperature sensors 20 in reference bodies 12 and 14 are applied through leads 54, in turn, to the analog to digital converter 52. The signals from the temperature sensors 22 are converted to the temperatures of the reference bodies 12 and 14, denoted here as $T_A$ and $T_B$, respectively. Finally, the signals from the converter 52 are applied to a micro-controller 88 where the temperature of the external body or product $T_p$ is calculated via the equation for $T_p$ described above; $T_p$ is displayed on temperature read-out 58. The micro-controller 88 can also be used to regulate the temperature $T_A$ of head 12 by controlling the amount of heating (or cooling) of that reference body 12 via a heat controller 60. The present invention is applicable regardless of the temperature scale used.

FIG. 2 illustrates an embodiment of the present invention particularly suited for measuring the temperature of objects that have curved surfaces such as rolls used in rolling metal, calendering and laminating of sheet material and heating of textiles and drying in paper mills. As shown in FIG. 2, the temperature of a continuous roll 26 is being measured by apparatus 28 which consists, in part, of reference bodies 30 and 32 separated by barrier 42. The contour shape of the operative faces 44 and 46 is designed to coincide with the curvature of the roll in order that the distance between the roll 26 and heat flow sensor 48 be the same as the distance between the roll 26 and heat flow sensor 84. The description of the rest of the apparatus, not shown, including means for regulating the temperature of one reference body, temperature sensors and micro-controller, is the same as set forth previously.

FIGS. 3, 4 and 5 show an embodiment of the present invention that is particularly suited for measuring the temperatures of wires, filaments or other elongated elements moving along their longitudinal axes. This preferred embodiment comprises generally an apparatus 62 with an aperture 64 of approximately ⅛ inch in diameter that runs through the length of the apparatus' 62 center. Apparatus 62 is shown as a cylindrical device but, as is apparent from the description hereinbelow, its outer configuration is unimportant. However, for ease of description, the cylindrical form will be used.

The apparatus 62 comprises, generally, two thermally conductive reference bodies 56 and 66 that are separated by a thermal barrier 68; temperature change means for altering the temperature of the head; including an electrical resistance heating element 70; heat flow sensors 72; and temperature sensors 74. Except as further described, the hereinabove described components of the reference bodies 56 and 66 in this preferred embodiment are substantially the same as those found in the first-described apparatus 10 in FIG. 1 and their descriptions shall not be repeated.

Guides 76 are annularly situated at the entrance 78 and exit 80 of the apparatus 62. The guides 76, which can be made of ceramic, form the only potential points of contact with the filament 82 and generate negligible frictional heat. It should be noted that the purpose of the guides 76 is to prevent filament 82 from touching the surface of the aperture 64 or any other part of the apparatus. The function of guides 76 is not to maintain the filament 82 at any particular location in the aperture 64. As will be apparent, apparatus 62 yields accurate temperature measurements regardless of the filament's position inside the aperture 64.

Referring to FIG. 4, each reference body 56 and 66 comprises a plurality of heat flow sensors 72 situated around the moving filament 82. In this embodiment, in each reference body 56 and 66 are four heat flow sensors 72, spaced approximately 90 degrees apart around the filament 82. The output signals from the four heat flow sensors 72 in each reference body 56 and 66 are applied through leads 50, in turn, to an analog to digital converter 52. Similarly, output signals from the temperature sensors 74 from both reference bodies 56 and 66 are applied through leads 54, in turn, to the converter array 52. The converter array 52 adjusts the four output signals from each of the heat flow sensors 72 of each reference body 56 and 66 to a convenient sensitivity in terms of volts per heat flow unit per unit area. The signals from the temperature sensors 74 are converted to the temperatures of the reference bodies, i.e., $T_A$ and $T_B$. Finally, the signals from the converter array 52 are applied to a micro-controller 54 where the temperature of the filament $T_p$ is calculated via the equation for $T_p$ described above; $T_p$ is displayed on temperature readout 58. The micro-controller 88 can be used to regulate the temperature $T_A$ by controlling the amount of heating (or cooling) of that reference body 56 via a heat controller 60.

The particular type of heat flow sensor or temperature sensor utilized in the various embodiments herein described need only be capable of providing an output directly proportional to heat flow, in the case of a heat flow sensor, or directly proportional to the temperature of the head or probe, in the case of the temperature sensor. Also, as will be apparent, the apparatus can be used with a variety of process controllers.

It is particularly noted that in utilizing the method and apparatus of the present invention, the temperature differences are at all times relatively small. That is, the temperature difference between the two reference bodies is in the order of 10° to 100° F.; moreover, the temperature differences between the reference bodies and the product is in the order of 0° to 100° F. As the external body passes by the operative faces, the fluid layers between the faces and external body take on temperature distributions which are dependent upon the temperatures of the reference and external bodies only. The reference bodies serve to isolate the measuring operation from the effects of the ambient temperature conditions, whereby the heat flows to be measured are a function of the relative temperatures of the reference bodies and the external body.

Although the various aspects of the present invention have been described with respect to the preferred embodiments, it will be understood that the invention is entitled to protection within the full scope of the appended claims.

It is claimed:

1. Apparatus for non-contact measurement of the temperature of a material, comprising:
   first and second thermally conductive reference bodies each having an operative face facing said material,
   means for maintaining said first and second reference bodies at different temperatures, including temperature change means mounted in said first reference body operative to change the temperature of said first reference body,
   first and second heat flow sensors of the same sensitivity carried by said first and second reference bodies, respectively, wherein said first heat flow sensor is reactive to heat flow through the operative face of the first reference body to generate a first heat flow output signal that is proportional to the heat flow rate through the operative face of the first reference body, and wherein said second heat flow sensor is reactive to heat flow through the operative face of the second reference body to generate a second heat flow output signal that is proportional to the heat flow rate through the operative face of the second reference body,
   first and second temperature sensors carried by said first and second reference bodies, respectively, wherein said first temperature sensor is in thermal communication with and adapted to generate a first temperature output signal that is proportional to the temperature of the first reference body and wherein said second temperature sensor is in thermal communication with and adapted to generate a second temperature output signal that is proportional to the temperature of the second reference body, and
   means responsive to said first and second heat flow output signals and to said first and second temperature output signals for calculating the temperature of said material.

2. The measurement apparatus according to claim 1 wherein each reference body is configured so that the operative face facing the material is contoured to coincide with the curvature of the surface of said material.

3. The measurement apparatus according to claim 1 further comprising means for guiding said material along a path that is generally parallel to the operative faces.

4. The measurement apparatus according to claim 1 wherein said calculating means determines the material temperature by employing the relationship that the material temperature is equal to the temperature of the first reference body plus the product of $E_A$ and B, where $E_A$ is the value of the first heat flow output signal, where B is equal to the quotient resulting from the division of C by D where C is equal to the temperature of the first reference body minus the temperature of the second reference body and D is equal to $E_B$ minus $E_A$, and where $E_B$ is the value of the second heat flow output signal.

5. Apparatus for non-contact measurement of the temperature of an elongated element comprising:
   first and second thermally conductive reference bodies, each having an operative face facing said elongated element,
   means for maintaining said first and second reference bodies at different temperatures, including temperature change means mounted in said first reference body operative to change the temperature of said first reference body,
   a plurality of first heat flow sensors carried by said first reference body and a plurality of second heat flow sensors carried by said second reference body, wherein said first heat flow sensors are reactive to heat flow through the operative face of the first reference body to generate a first heat flow output signal that is proportional to the heat flow rate through the operative face of the first reference body, and wherein said second heat flow sensors are reactive to heat flow through the operative face of the second reference body to generate a second heat flow output signal that is proportional to the heat flow rate through the operative face of the second reference body,
   first and second temperature sensors carried by said first and second reference bodies, respectively, wherein said first temperature sensor is in thermal communication with and adapted to generate a first temperature output signal that is proportional to the temperature of the first reference body, and wherein said second temperature sensor is in thermal communication with and adapted to generate a second temperature output signal that is proportional to the temperature of the second reference body, and
   means responsive to said first and second heat flow output signals and said first and second temperature output signals for calculating the temperature of said elongated element.

6. The measurement apparatus according to claim 5 wherein the sensitivity of the plurality of first heat flow sensors, when measured as a whole is equal to the sensitivity of the plurality of second heat flow sensors, when measured as a whole.

7. The measurement apparatus according to claim 5 wherein the plurality of first heat flow sensors are situated around the elongated element and similarly the plurality of second heat flow sensors are situated around the elongated element.

8. The measurement apparatus according to claim 5 wherein said calculating means determines the temperature of the elongated moving element by employing the relationship that the element temperature is equal to the temperature of the first reference body plus the product of $E_A$ and B, where $E_A$ is proportional to the sum of the values of the output signals generated by the plurality of first heat flow sensors, where B is equal to the quotient resulting from the division of C by D where C is equal to the temperature of the first reference body minus the temperature of the second reference body and D is equal to $E_B$ minus $E_A$, and where $E_B$ is proportional to the sum the values of the output signals generated by the plurality of second heat flow sensors.

9. Temperature measuring apparatus according to either of claims 1, 2, 3, 4, 5, 6, 7, or 8 further comprising a radiant heat reflective coating over said thermally conductive reference body surfaces and said heat flow sensors whereby said heat flow sensors are not reactive to radiant heat flow.

10. A method of measuring the temperature of a material comprising the steps of:

positioning said material adjacent to first and second thermally conductive reference bodies, so that the distance between the first reference body and said material is the same as the distance between the second reference body and said material, with the material spaced sufficiently close to each reference body so that substantially all of any heat transfer therebetween is conductive—convective heat transfer and only a minor portion is radiant heat transfer, maintaining a temperature difference between the first and second reference bodies, measuring the temperatures of the first and second reference bodies with first and second temperature sensors carried therein, respectively, whereby the first temperature sensor generates a temperature output signal that is proportional to the temperature of the first reference body and the second temperature sensor generates a temperature output that is signal proportional to the temperature of the second reference body, measuring the net rates of the conductive, convective, and radiative heat flow between said material and said first and second thermally conductive reference bodies with first and second heat flow sensors of the same sensitivity carried therein, respectively, wherein said first heat flow sensor is reactive to heat flow through the first reference body to generate a first heat flow output signal that is proportional to the heat flow rate through the first reference body, with said first heat flow sensor situated near the first reference body surface, and wherein said second heat flow sensor is reactive to heat flow through the second reference body to generate a second heat flow output signal that is proportional to the heat flow rate through the second reference body, with said second heat flow sensor situated near the second reference body surface; and calculating the temperature of the material by employing the relationship that the material temperature is equal to the temperature of the first reference body plus the product of $E_A$ and B, where $E_A$ is the value of the first heat flow output signal where B is equal to the quotient resulting from the division of C by D where C is equal to the temperature of the first reference body minus the temperature of the second reference body and D is equal to $E_B$ minus $E_A$, and where $E_B$ is the value of the second heat flow output signal.

* * * * *

UNITED STATES PATENT AND TRADEMARK OFFICE
CERTIFICATE OF CORRECTION

PATENT NO. : 5,216,625

DATED : June 1, 1993

INVENTOR(S) : Dieter L. Rall

It is certified that error appears in the above-identified patent and that said Letters Patent is hereby corrected as shown below:

Column 10, line 10, in Claim 10: Replace "that is signal proportional" with --signal that is proportional--

Signed and Sealed this

Twenty-sixth Day of April, 1994

Attest:

BRUCE LEHMAN

*Attesting Officer*     *Commissioner of Patents and Trademarks*